Figure 1:
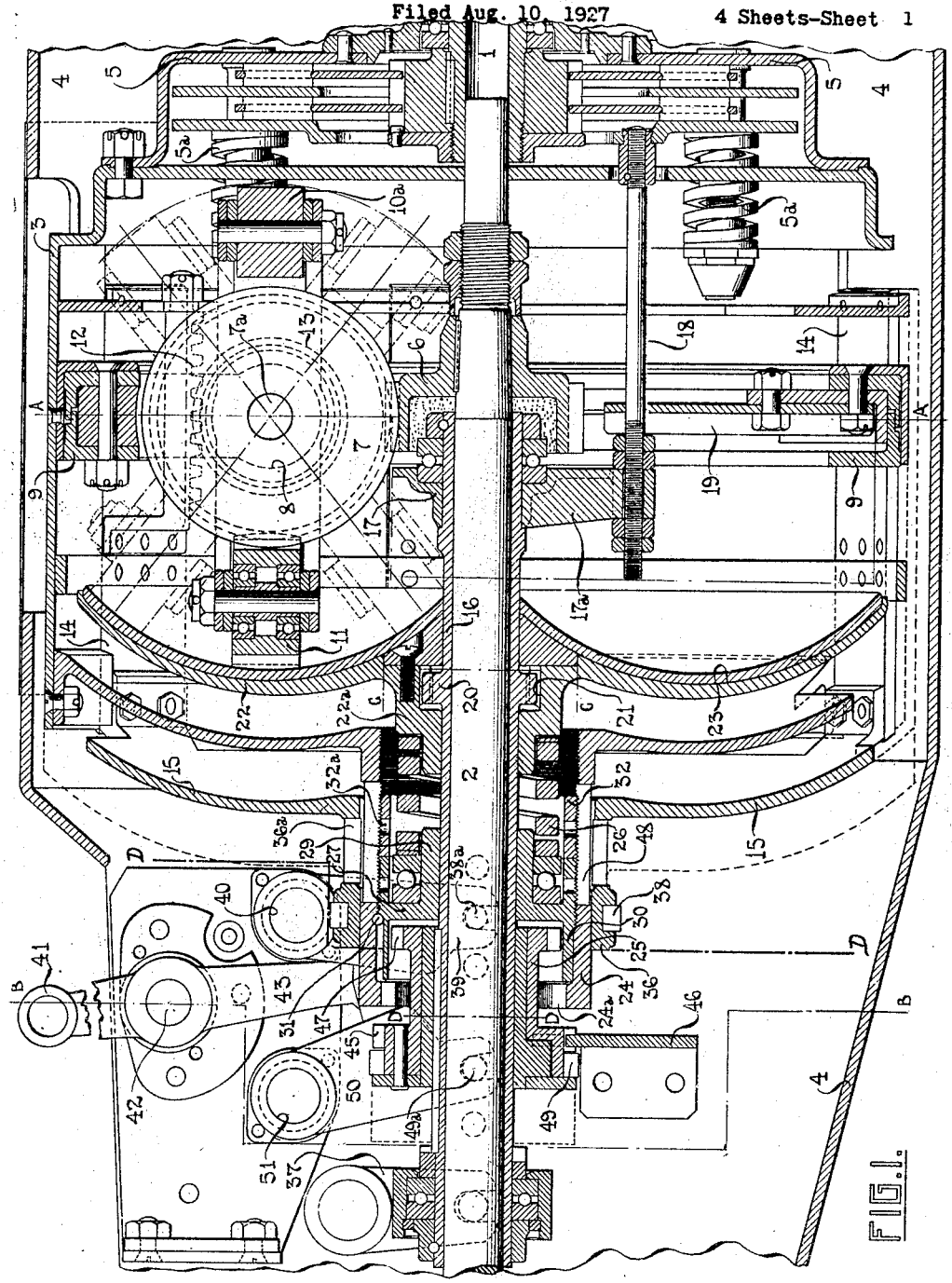

Dec. 11, 1928.  
H. B. MURRAY  
1,694,554  
VARIABLE SPEED GEAR AND REVERSE FOR MOTOR VEHICLES AND OTHER MACHINES  
Filed Aug. 10, 1927  
4 Sheets-Sheet 1

H. B. Murray  
INVENTOR  
By: Marks & Clerk  
Attys.

Dec. 11, 1928.　　　　　　　　　　　　　　　　　　　1,694,554
H. B. MURRAY
VARIABLE SPEED GEAR AND REVERSE FOR MOTOR VEHICLES AND OTHER MACHINES
Filed Aug. 10, 1927　　　　　4 Sheets-Sheet 2

H. B. Murray
INVENTOR
By: Marks & Clerk
Attys.

Dec. 11, 1928.

H. B. MURRAY 1,694,554

VARIABLE SPEED GEAR AND REVERSE FOR MOTOR VEHICLES AND OTHER MACHINES

Filed Aug. 10, 1927    4 Sheets-Sheet 3

H. B. Murray
INVENTOR

By: Marks & Clerk

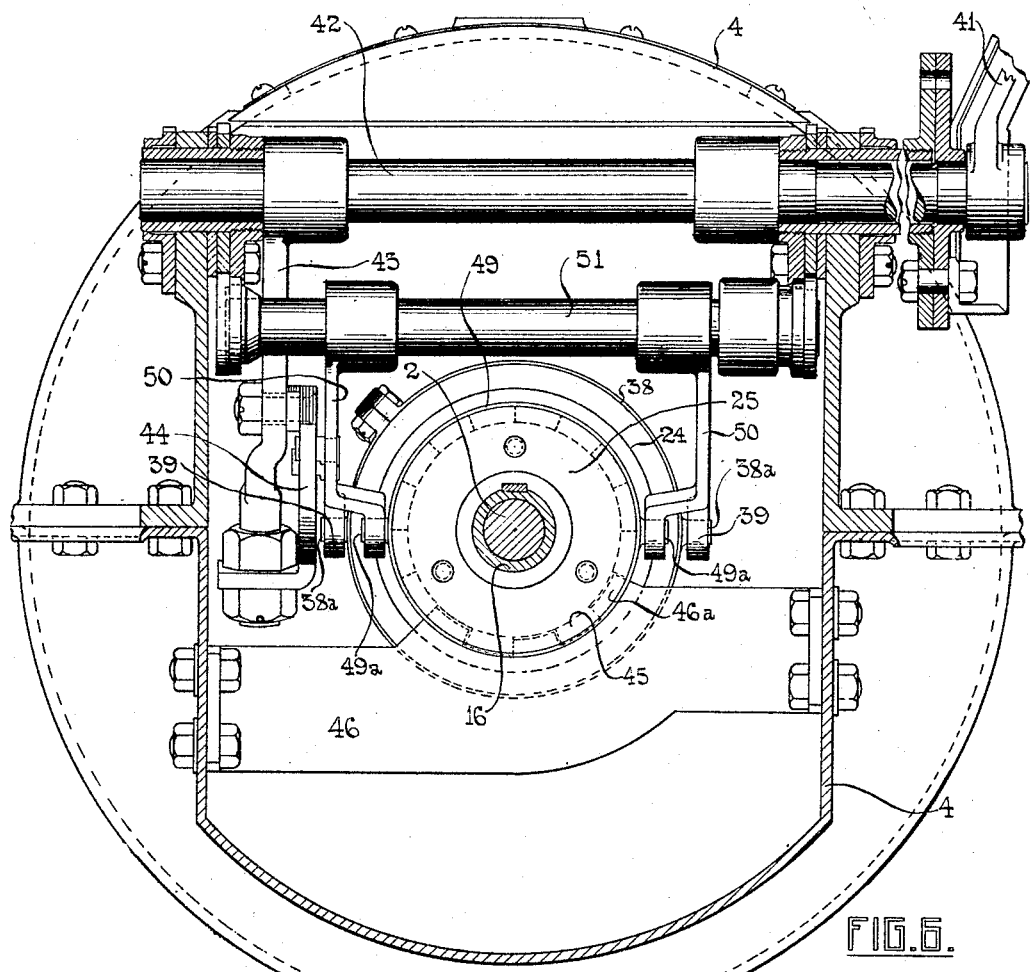
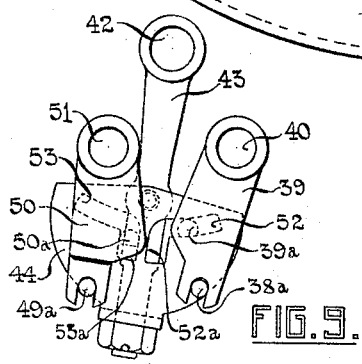
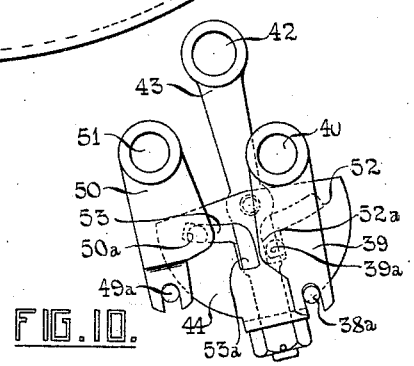

Patented Dec. 11, 1928.

1,694,554

UNITED STATES PATENT OFFICE.

HUGH BARTON MURRAY, OF WELLINGTON, NEW ZEALAND.

VARIABLE-SPEED GEAR AND REVERSE FOR MOTOR VEHICLES AND OTHER MACHINES.

Application filed August 10, 1927, Serial No. 212,072, and in New Zealand June 21, 1927.

This invention relates to variable speed gears used on motor vehicles and other machines and has for its object the provision of an improved form of speed gear designed to give, in that type of speed gear mechanism wherein the gear wheels are continuously in mesh and planet pinions are employed, a direct drive, an infinitely variable range of speeds, and a reverse.

The invention consists in providing for the transmission of turning movement from a driving shaft to a driven shaft, through means comprising a rotary member surrounding the driven shaft and adapted to rotate with the driving shaft, skew gearing between the rotary member and the driven shaft, means for causing the skew gearing to lock the latter and the rotary member together, so that the driving and driven shafts rotate at the same speed, and means for driving said skew gearing while being rotated with the driven shaft, and so as to vary the speed of the latter, in relation to the driving shaft.

The invention further consists in the employment of planet skew gear wheels meshing with a skew gear wheel keyed on the driven shaft, said planet wheels having their axes disposed at right angles to the axis of the driven shaft and skew gear wheel thereon, and also meshing with further skew gear wheels adapted to engage a disc at varying points in the radius of the latter, for the purpose of driving the skew gear wheels about their own axes, while being rotated with the driven shaft, and also for holding the skew gear wheels which contact with the disc, and also the planet skew gear wheels, against a turning movement about their own axes, while rotating with the driven shaft, so as to lock the driven shaft and the rotary frame together.

Other features are also comprised in the invention which will be described in detail in the accompanying drawings, wherein it is shown in a form suitable for use on a motor vehicle.

In the drawing:—

Figures 2, 3, 4:
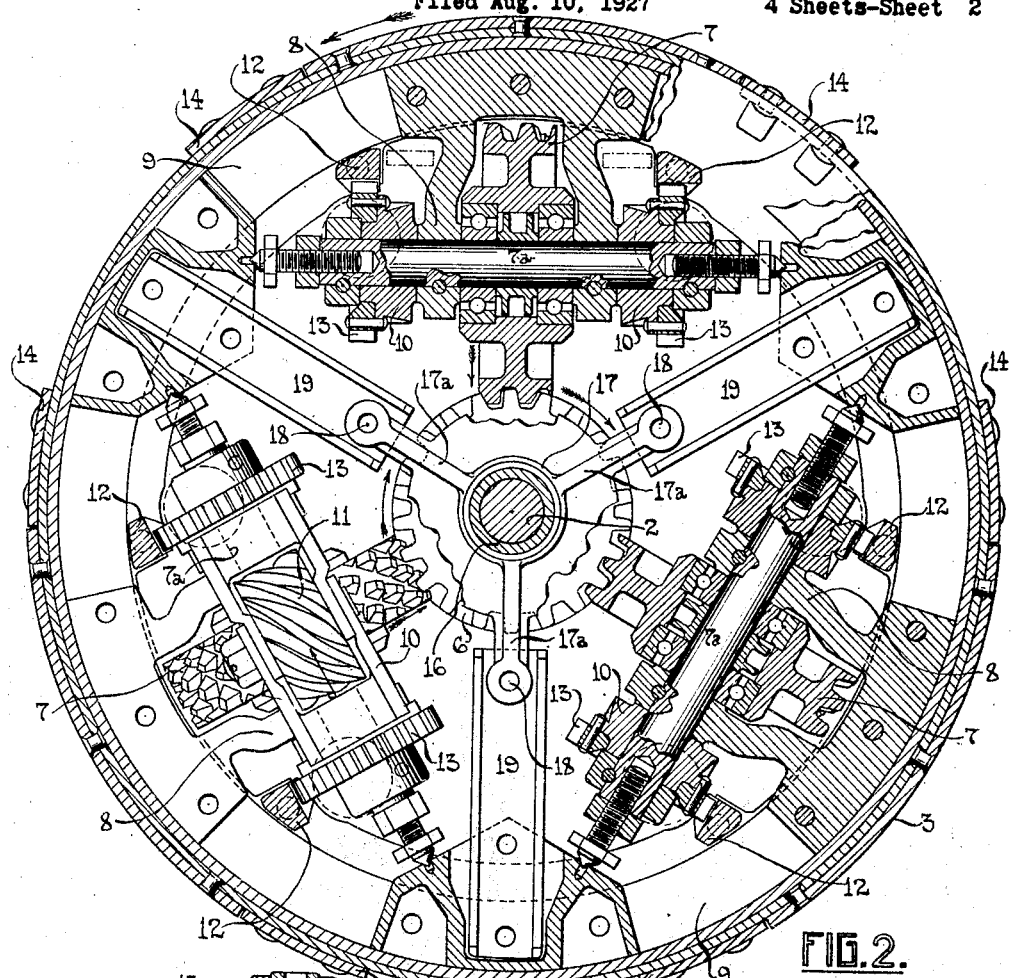
Figure 5:
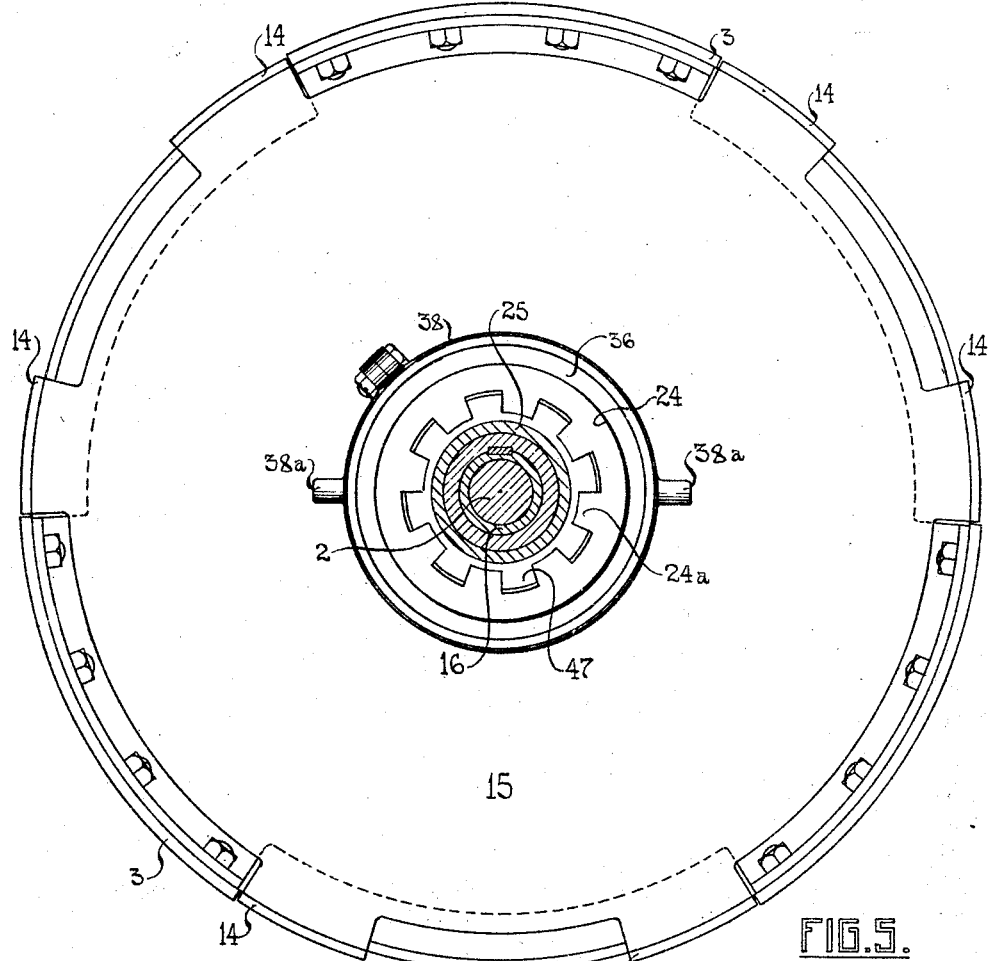

Figure 1 is a longitudinal sectional elevation of the improved speed gear and reverse, Figure 2 a cross sectional view on the line A—A Figure 1, Figure 3 a part sectional plan view of a planet wheel and the mounting for a swinging skew gear wheel, meshing therewith, Figure 4 a cross sectional view on the line C—C Figure 1, Figure 5 a cross sectional view on the line D—D Figure 1, Figure 6 a cross sectional view on the line B—B Figure 1, Figures 7 to 10 detail views illustrating the positions of operating mechanism in obtaining different speeds, a direct drive and a reverse.

In the drawing, 1 represents the driving shaft and 2 the driven shaft about which is rotatable a frame member 3, located within a casing 4, the shafts 1 and 2 being in axial alignment with each other, while the frame member 3 is adapted to be rotated from the shaft 1 through a clutch 5 of any suitable design, and in the case of a motor vehicle the shaft 2 is adapted to be connected with and operate a propeller shaft per medium of a universal joint in the usual manner.

Keyed on the driven shaft 2 is a skew or spiral gear wheel 6, with which mesh skew planet gear wheels 7 the axes of which are disposed at right angles to the axis of the driven shaft 2, and the skew or spiral gear wheel 6 thereon.

The axles or spindles $7^a$ of the planet gear wheels 7 are held by inwardly extending bearings 8 secured to the rotary frame member 3 around the interior of which the planet gear wheels 7 are equally spaced, said bearings 8 preferably being carried by a ring 9 of channel cross section adapted to be secured to the frame member 3, so that said wheels 7, the bearings 8 and the parts they carry can be fitted in the rotary frame member 3 as a single unit.

On the axle or spindle $7^a$ of each planet wheel 7 is mounted a frame 10 (Figure 3) capable of being rocked or swung thereon, each frame 10 carrying a further or swinging skew gear wheel 11 which meshes with the planet gear wheel 7 on the axle or spindle $7^a$ of which said frame 10 is mounted, the axis of each swinging skew gear wheel 11 being at right angles to the axis of its coacting planet gear wheel 7, while each frame 10 is weighted at $10^a$ to balance the skew gear wheel 11 it carries, said wheels 11 being adapted to be swung about the axes of the skew planet gear wheels 7 to or from the driven shaft 2, per medium of toothed racks 12, meshing with pinions 13 fixed to the swinging frames 10.

The racks 12 operate longitudinally of the rotary frame member 3 and are caused to operate together by being attached to bars 14 slidable on said frame members 3 and connected at their rear ends to a disc 15 slidable at the rear end of the rotary frame member through means which will be hereinafter described.

Slidable on the driven shaft 2, and free thereon as regards turning movement therewith, is a sleeve 16 having secured on its forward end and free thereon as regarding turning movement therewith, a member 17 with radial arms 17$^a$ to which are connected the rear ends of rods 18 slidable through guides 19 carried by the rotary frame member 3, said rods 18 passing through the front end of the rotary frame member 3 and being attached at their forward ends to the operating or male member of the clutch 5.

The sleeve 16 is provided with a toothed collar 20 which engages in an annular recess 21, having internal teeth 21$^a$, in the boss 22$^a$ of a friction disc 22 adapted to contact with the toothed peripheries of the swinging skew gear wheels 11, said recess 21 having a greater width than the toothed collar 20, and also having one side formed by a detachable portion of said boss 22$^a$ to enable the collar 20 to be entered therein.

The friction disc 22 contains a circular recess 23, having a concave cross section, the radius of the concavity being struck from the centres of the skew planet gear wheels 7, about which the swinging skew gear wheels 11 are swung under the action of the toothed racks 12 aforesaid, the circular recess 23 being lined with suitable friction material.

The rear end of the rotary frame member 3 has formed integral therewith a rearwardly extending hollow boss 24, the rear end of which contains a toothed opening 24$^a$ surrounding a doubled ended toothed clutch 25, (hereinafter described) said boss 24 forming a housing for a spring 26 in compression between a shoulder on the boss 22$^a$ of the friction disc 22, and a ring 27 either comprised in a member screwing into said boss 24, or formed integral therewith, said ring 27, in both cases being provided with an inner sleeve 29 which surrounds the sleeve 16 on the driven shaft 2 and constitutes a bearing or support for the rear end of the rotary frame member 3.

When the ring 27 forms part of a separate member screwing into the boss 24, it has a further or rear sleeve extension 30, and is locked to the hollow boss 24 of the rear end of the rotary frame member 3 by a cross pin 31 engaging a flat formed on said sleeve extension 30, and can be further secured by a jam nut 32 screwed tightly against it inside said hollow boss 24, the nut 32 containing radial holes 32$^a$ and being adjustable through openings 48 in the hollow boss 24 for the purpose of regulating the action of the spring 26.

The sleeve 16 on the driven shaft 2 is given longitudinal movement on the latter against the action of the springs 5$^a$ of the clutch 5 and the spring 26, to throw the clutch 5 "out", and to move the friction disc 22 from contact with the peripheries of the swinging skew gear wheels 11 through forked or slotted levers 37 mounted and operated to impart movement to said sleeve 16 from a clutch pedal (not shown) through suitable approved means.

The disc 15 to which are connected the bars 14 carrying the longitudinally operable toothed racks 12 meshing with the pinions 13 fixed to the swinging frames 10, is formed with a rear sleeve extension 36 containing openings 36$^a$ and is slidable on the hollow boss 24 on the rear end of the rotary frame member 3, said sleeve extension 36 containing a peripheral recess on which is fitted a ring 38 carrying trunnion pins 38$^a$ which are engaged by slotted levers 39 (Figure 6) both keyed on the same spindle 40, said levers 39 being actuated from a hand lever 41 through a shaft 42 and intermediate lever 43 fitted with a slotted plate 44 as will be described later.

The double ended toothed clutch 25 is slidably keyed on the sleeve 16 on the driven shaft 2, one set of teeth 45 being provided so that in one extreme position of the clutch they engage in a corresponding set of teeth 46$^a$ in a plate 46 a fixture on the casing 4, and hold said sleeve 16 and the friction disc 22 carried thereon, against turning movement, the other set of teeth 47 of the clutch 25 being meanwhile disengaged, movement of the clutch 25 to its extreme reverse position disengaging the teeth 45 of the clutch from the teeth 46$^a$ of the fixed plate 46, and engaging the teeth 47 with the teeth 24$^a$ formed internally in the rear end of the hollow boss 24 of the rotary frame member 3, so as to cause the sleeve 16 on the driven shaft 2, and the friction disc 22 thereon, to turn with the rotary frame member 3 carrying the planet gear wheels 7 and the swinging skew gear wheels 11.

This double ended clutch 25 also contains a circular recess in which is fitted a ring 49 carrying trunnion pins 49$^a$ engaged by slotted levers 50 (Figure 6) both keyed on the same spindle 51, and operated through the before mentioned slotted plate 44 from the hand lever 41.

The lever 43 carrying the slotted plate 44, is keyed on the same shaft or spindle 42 as the hand lever 41, said shaft or spindle 42 being parallel with the spindles 40, 51 carrying the slotted levers 39, 50 and being located centrally above the latter.

The lever 43 carrying the slotted plate 44 (see Figures 7 to 10) is mounted so that the slots 52, 53 in said plate engage pins 39ª, 50ª respectively, projecting from the slotted levers 39, 50 located at the same side of the driven shaft 2 (Figure 6) the slots 52, 53 in the plate 44 being formed with a curve struck from the centre about which the lever 43 moves, and also having downwardly extending or drop portions 52ª and 53ª into which the pins 39ª and 50ª may pass.

With the swinging skew gear wheels 11 held against turning movement about their own axes, by the concave friction disc 22, and the driving shaft 1 clutched to the rotary frame member 3 by the clutch 5, said frame 3 is locked to the driven shaft 2 by the planet wheels 7 and the skew gear wheel 6 on said shaft 2, and a direct drive is obtained, the whole mechanism revolving as one unit, during which time the sleeve 16 and the friction disc 22 are locked to, and turn with the rotary frame member 3 per medium of the clutch 25.

In order to obtain the direct drive, the hand lever 41 is moved to bring the lever 43 carrying the slotted plate 44 to the position shown in Figure 9, in which position it will be noted, the pin 50ª of the slotted lever 50 (which with its fellow lever actuates the clutch 25) is engaged in the downwardly extending portion 53ª of the slot 53 in the plate 44, whereby said levers 50 have been given movement by the latter, to cause said slotted levers 50 to slide the clutch 25 rearwards along the sleeve 16 and bring the clutch teeth 47 into engagement with the teeth 24ª of the boss 24 of the rotary frame member 3, and so lock the latter to the sleeve 16 which is already locked as regards turning movement to the friction disc 22, as before mentioned.

During the direct drive, it is immaterial what position the swinging skew gear wheels 11 occupy, as regards the distance they are located from the driven shaft 2, because owing to the friction disc 22 turning with the rotary frame member 3, said wheels 11, are not given turning movement about their own axes, and the planet wheels are rendered inoperative as regards turning movement about their own axes.

When it is desired that the shaft 2 shall be driven at a speed differing from that of the driving shaft 1, it is necessary that said shaft 2 be given turning movement in addition to that transmitted from the shaft 1, and if the additional turning movement imparted to the shaft 2, be in the reverse direction to that of the shaft 1, and at a slower speed than the latter, said shaft 2 will be driven at a slower speed than, and in the same direction as the driving shaft 1, while if the additional reverse turning movement imparted to the driven shaft 2 be at a speed exceeding that of the driving shaft 1, the result will be that the shaft 2 will transmit a turning movement in the reverse direction to that of the driving shaft 1, at a speed equal to the difference between the speed of the driving shaft 1, and the speed of the additional turning movement given the shaft 2.

In order to impart the additional turning movement to the shaft 2, the swinging skew gears 11 and the planet wheels 7 are caused to turn about their own axes, to drive the skew gear wheel 6 keyed on the shaft 2, the operations and action being as follows.

The clutch pedal (not shown) is first operated to slide the sleeve 16 rearwards along the shaft 2 against the action of the clutch spring 5ª and the friction disc spring 26, which action declutches the shaft 1 from the rotary frame member 3, and also moves the friction disc 22 from contact with the peripheries of the swinging skew gears 11, the declutching of the shaft 1 from the rotary frame member 3 taking place slightly in advance of the freeing of the skew gears 11 by the disc 22, owing to the toothed recess 21 in the disc boss 22ª being wider than the toothed collar 20 on the sleeve 16. Following the operations just mentioned the lever 41 is actuated to cause the clutch levers 50 to slide the clutch 25 along the sleeve 16 so that its teeth 47 clear the teeth 24ª of the hollow boss 24, and so that its teeth 45 will engage in the teeth 46ª of the fixed plate 46, the clutch levers 50 coming to the position shown in Figures 7, 8 and 10, and remaining in said position to hold the disc 22 against turning with the rotary frame member 3, except when a direct drive is desired.

Upon the clutch pedal being released the friction disc 22 is forced against the swinging skew gears 11, and the shaft 1 is clutched to the rotary frame member 3 by the action of the springs 26 and 5ª.

Before however the clutch pedal is released, the swinging skew gears 11 are operated from the lever 41 through the shaft or spindle 42, lever 43, plate 44, levers 39, and sleeve extension 36, disc 15, bars 14, racks 12, pinions 13 and frames 10, to swing about the axes of the planet wheels 7 and move towards or from the shaft 2, so that upon the now stationary friction disc 22 being again pressed into contact with said swinging skew gears 11 the latter and the planet wheels 7 will be turned about their own axes, at speeds varying according to the radius from the centre of the shaft 2, to the points at which said skew gears 11 contact with the disc 22, and which will increase, decrease or neutralize the turning movement of the shaft 2, or cause reverse turning motion to be imparted thereto.

In moving the lever 43 which carries the slotted plate 44 from the "direct drive" position (Figure 9), to any "in gear" position or the "reverse" position (Figures 7, 8 and 10) the clutch levers 50, are, by the engagement of the pin 50ª in the downwardly extending portion of the slot 53, brought to the position shown in the last mentioned figures, whereupon the pin 50ª is so positioned that the slot 53 afterwards passes freely thereon, and enables the lever 43 to be moved to actuate the levers 39 through the pin 39ª and plate 44, to transmit movement to the racks 12 for the purpose of varying the positions of the swinging skew gears 11, without moving the clutch 25.

Figure 7:
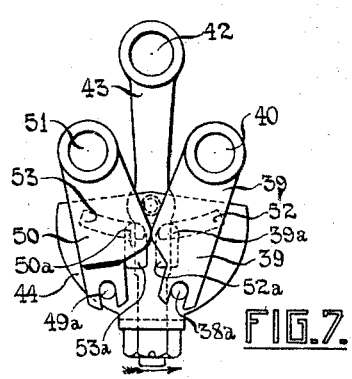
Figure 8:
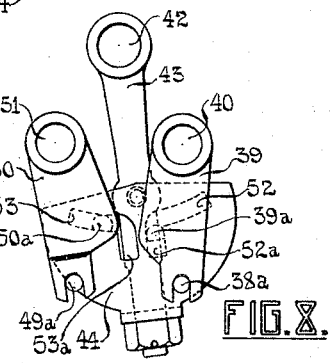

The position of the lever 43 when in the highest "in gear" position is illustrated in Figure 7, the swinging skew gear wheels 11, in this position of said lever being closest to the shaft 2, the pin 39ª being located at the inner end of the slot 52 so that movement of the lever 43 in the direction indicated by the arrow will actuate the levers 39 to slide the disc 15, and toothed racks 12 in a direction which will move the swinging skew gear wheels 11 away from the shaft 2.

Movement of the lever 43 in the direction indicated by the arrow whether simply to obtain a lower gear, or to obtain a reverse drive, results in the pin 39ª passing into the downwardly extending portion 52ª of the slot 52, so that when return movement of the lever 43 is effected, the slotted levers 39 are actuated to bring about inward movement of the swinging skew gear wheels 11.

Similarly in moving the lever 43 from an "in gear" position to the direct drive position, the pin 50ª of the lever 50 is engaged by the inner end of the slot 53 and effects the necessary change in position of the clutch 25.

The angles at which the teeth or threads of the skew gear wheels are formed can be uniform throughout, or said angles can be varied, the planet wheels 7 being both right and left hand threaded at uniform or varying angles of inclination, and where desired the angles of said teeth may be formed to give the driven shaft 2 an increase of speed over that of the driving shaft 1, the planet wheels in the last mentioned case being formed either with a right hand or a left hand thread only thereon.

The friction disc 22 can if desired be formed with teeth on its recessed side to provide a positive drive to the swinging skew gear wheels, 11.

What I do claim and desire to obtain by Letters Patents of the United States of America is:—

1. In a speed gear and reverse mechanism for motor vehicles and other machines, comprising a driving shaft, a driven shaft, a rotary member surrounding the latter and adapted to rotate with the driving shaft, skew gears carried by the rotary member and the driven shaft, selectively operative means for preventing relative rotation of the skew gears whereby the driving and driven shaft rotate together at the same speed, or for driving the skew gearing while the same is being rotated with the driving shaft, so as to vary the speed of rotation of the driven shaft and means to vary the position of the skew gearing to effect a reversal of the turning movement of the driven shaft.

2. Speed gear reverse mechanism for motor vehicles and other machines comprising a driving shaft, a driven shaft, a rotary member surrounding the latter and adapted to rotate with the driving shaft, skew gearing carried by the rotary member and the driven shaft, said skew gearing comprising a skew gear wheel keyed on the main shaft, planet skew gear wheels carried by said rotary member meshing with the skew gear wheels on the driven shaft and further skew gear wheels carried by said rotating member and meshing with the said planet wheels and adapted to drive said planet skew gears and a disk selectively held against rotation mounted on said driven shaft and adapted to engage and rotate the further skew gears.

3. In a speed gear and reverse mechanism for motor vehicles and other machines according to claim 2 wherein means are provided for mounting the further gear wheels to swing about the axis of the planet wheels to engage the disk at varying points in the radius thereof.

4. In a speed gear and reverse mechanism for motor vehicles and other machines as claimed in claim 2 wherein means are provided for mounting said further gear wheels to swing about the axis of the planet wheels to engage the disk at varying points in the radius thereof, of means to selectively lock said disk against rotary movement whereby the further gear wheels are rotated about their own axes or to selectively lock said disk to rotate with said driving shaft whereby said further gear wheels are locked against movement on their axes.

5. In a speed gear and reverse mechanism for motor vehicles and other machines according to claim 2, wherein the disk contains a circular recess and means for mounting the further skew gears to swing about the axis of the planetary gears, said recess being concave in cross-section and having a curve struck from the center of the planet wheels' axes.

6. In a speed gear and reverse mechanism for motor vehicles and other machines as claimed in claim 2 and in combination therewith of means to move the disk engaging the further skew gear wheels away from the latter and a spring returning said disk to normal position.

7. In a speed gear and reverse mechanism for motor vehicles and other machines as claimed in claim 2, wherein means are provided for mounting said further gear wheels to swing about the axes of the planet wheels, said means for swinging said further gear wheels comprising sliding toothed racks and pinions secured to the means on which the further skew gears swing.

8. In a speed gear and reverse mechanism for motor vehicles and other machines as claimed in claim 2 wherein the disk is adapted to be locked by clutch mechanism either to the rotary member carrying the planet wheels or to a stationary part of the vehicle or machine.

9. In a speed gear and reverse mechanism for motor vehicles and other machines comprising a driving shaft and a driven shaft, a member mounted on said driving shaft to be rotated therewith, said member carrying planet gear wheels, skew gear wheels and means to mount said skew gear wheels to swing about the axis of the planetary gear wheels, a skew gear wheel mounted on the driven shaft, said planetary gear wheels being in meshing engagement with both said skew gear wheels, means for swinging the mounting of said first mentioned skew gear wheel about its axis comprising racks, pinions and a sliding disk connected to said racks, a disk freely mounted on said driven shaft and means for selectively locking said disk for rotation with said rotatable member or for locking said disk against rotation to a stationary part of machine or vehicle, said locking means comprising a sliding clutch, means for operating said sliding clutch comprising a hand lever, an intermediate lever on the hand lever, a plate on said intermediate lever containing curved slots with downwardly extending portions, slotted levers engaging the sliding clutch, slotted levers engaging a sleeve extension of the sliding disk connected with the racks and pins on said slotted levers engaging in the slots in the plate on the intermediate lever.

In testimony whereof I affix my signature.

HUGH BARTON MURRAY.